(12) United States Patent
Field et al.

(10) Patent No.: US 8,850,546 B1
(45) Date of Patent: Sep. 30, 2014

(54) PRIVACY-PRESERVING USER ATTRIBUTE RELEASE AND SESSION MANAGEMENT

(71) Applicant: EMC Corporation, Hopkinton, MA (US)

(72) Inventors: John P. Field, Chatham, NJ (US); Vijayanand Bharadwaj, White Plains, NY (US); David A. Ohsie, Baltimore, MD (US)

(73) Assignee: EMC Corporation, Hopkinton, MA (US)

( * ) Notice: Subject to any disclaimer, the term of this patent is extended or adjusted under 35 U.S.C. 154(b) by 108 days.

(21) Appl. No.: 13/632,014

(22) Filed: Sep. 30, 2012

(51) Int. Cl.
*G06F 21/41* (2013.01)

(52) U.S. Cl.
USPC .......................... 726/8; 726/1; 726/4; 726/5

(58) Field of Classification Search
None
See application file for complete search history.

(56) References Cited

U.S. PATENT DOCUMENTS

| | | | |
|---|---|---|---|
| 7,607,008 B2 * | 10/2009 | Howard et al. | 713/155 |
| 2004/0128546 A1 * | 7/2004 | Blakley et al. | 713/201 |
| 2006/0123472 A1 * | 6/2006 | Schmidt et al. | 726/8 |
| 2007/0234417 A1 * | 10/2007 | Blakley, III et al. | 726/12 |
| 2011/0154465 A1 * | 6/2011 | Kuzin et al. | 726/9 |
| 2012/0011578 A1 * | 1/2012 | Hinton et al. | 726/8 |
| 2012/0144034 A1 * | 6/2012 | McCarty | 709/225 |

OTHER PUBLICATIONS

Cloud Security Alliance, Domain 12: Guidance for Identity & Access Management V2.1, Apr. 2010, Cloud Security Alliance, pp. 1-39.*

* cited by examiner

*Primary Examiner* — Nadia Khoshnoodi
*Assistant Examiner* — Adrian Stoica
(74) *Attorney, Agent, or Firm* — Ryan, Mason & Lewis, LLP

(57) ABSTRACT

An information processing system comprises one or more processing devices of at least one processing platform. In one embodiment, the system comprises cloud infrastructure that is configured to validate an externally-generated security token issued to a user, to extract one or more claims from the validated externally-generated security token, and to create a session object to hold the extracted claim or claims. The cloud infrastructure issues an internally-generated security token based on the session object that allows the user to be identified to a protected resource. The internally-generated security token is validated in conjunction with a request from the user for access to the protected resource, and information associated with at least one extracted claim is selectively released responsive to validation of the internally-generated security token. Access of the user to the protected resource is granted or denied based on the selectively-released information.

28 Claims, 4 Drawing Sheets

PRIVACY-PRESERVING USER ATTRIBUTE RELEASE AND SESSION MANAGEMENT

FIELD

The field relates generally to information processing systems, and more particularly to controlling access to protected resources in such systems.

BACKGROUND

An increasing number of companies and other enterprises are reducing their costs by migrating portions of their information technology (IT) infrastructure to cloud service providers. For example, virtual data centers and other types of systems comprising cloud infrastructure are coming into widespread use. Typical cloud service offerings include, for example, Infrastructure-as-a-Service (IaaS), Platform-as-a-Service (PaaS), and Software-as-a-Service (SaaS). In cloud-based information processing systems, enterprises in effect become tenants of the cloud service providers.

A given enterprise tenancy maintained in cloud infrastructure by a cloud service provider will typically comprise a large number of protected resources, such as applications, computational resources and storage resources. It is important that access to such resources be controlled in a secure manner. In one conventional arrangement, a user can establish a session with the cloud service provider in order to access one or more of the protected resources of the enterprise tenancy. This may involve the user obtaining an attestation or other security token from an identity provider and presenting it to the cloud service provider in order to obtain access to the protected resources.

However, arrangements of this type often require that the access control entity either maintain a live connection back to the identity provider or provide local persistent storage for user identifiers and other associated security attributes.

The maintenance of a live connection back to the identity provider is problematic in that it complicates session management and introduces additional opportunities for attackers. It may also present a conflict with well-established network perimeter controls.

The use of local persistent storage to hold user attributes is also problematic in that the private user attribute information that is held persistently by the cloud service provider is directly vulnerable in the event that the security of the cloud infrastructure is breached.

Also, persistent storage of such information will often require the cloud service provider to maintain one or more access control list (ACL) databases in order to support aliasing between a user identifier or other user attribute associated with the security token obtained from the identity provider and a locally defined identifier for use within the cloud infrastructure. Provisioning and maintaining such ACL databases can be unduly costly and inefficient for the cloud service provider.

Conventional single sign-on (SSO) approaches are also problematic in that such approaches generally assume that the cloud service provider has an on-going ability to validate a security token with the original external source of that token. As indicated previously, it is often not possible in cloud environments to maintain a live connection back to an external identity provider in order to support such functionality.

SUMMARY

Embodiments of the present invention provide improved access control for protected resources of cloud infrastructure or other types of IT infrastructure through privacy-preserving user attribute release and associated session management. A given embodiment can comprehensively manage the transformation of user attribute information for controlling access to different protected resources in a manner that provides optimal preservation of user privacy in these attributes. Risk of loss of user attribute information is therefore significantly reduced even in the event of a breach in cloud infrastructure security.

In one embodiment, cloud infrastructure of an information processing system comprises one or more processing devices of at least one processing platform. The cloud infrastructure is configured to validate an externally-generated security token issued to a user, to extract one or more claims from the validated externally-generated security token, and to create a session object to hold the extracted claim or claims. The cloud infrastructure issues an internally-generated security token based on the session object that allows the user to be identified to a protected resource. The internally-generated security token is validated in conjunction with a request from the user for access to the protected resource, and information associated with at least one extracted claim is selectively released responsive to validation of the internally-generated security token. Access of the user to the protected resource is granted or denied based on the selectively-released information.

By way of example, the cloud infrastructure may be more particularly configured to issue a plurality of internally-generated security tokens, including a first internally-generated security token to represent that a valid login session has been established for the user, and additional internally-generated security tokens comprising respective service-specific security tokens configured to permit the user to prove its identity to respective services provided in local domains of the cloud infrastructure.

One or more of the embodiments described herein can be advantageously configured to eliminate the need to maintain any live connection back to an external identity provider, as well as the need to persistently store user attribute information within the cloud infrastructure. In addition, the complexities associated with provisioning and maintenance of ACL databases are avoided.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
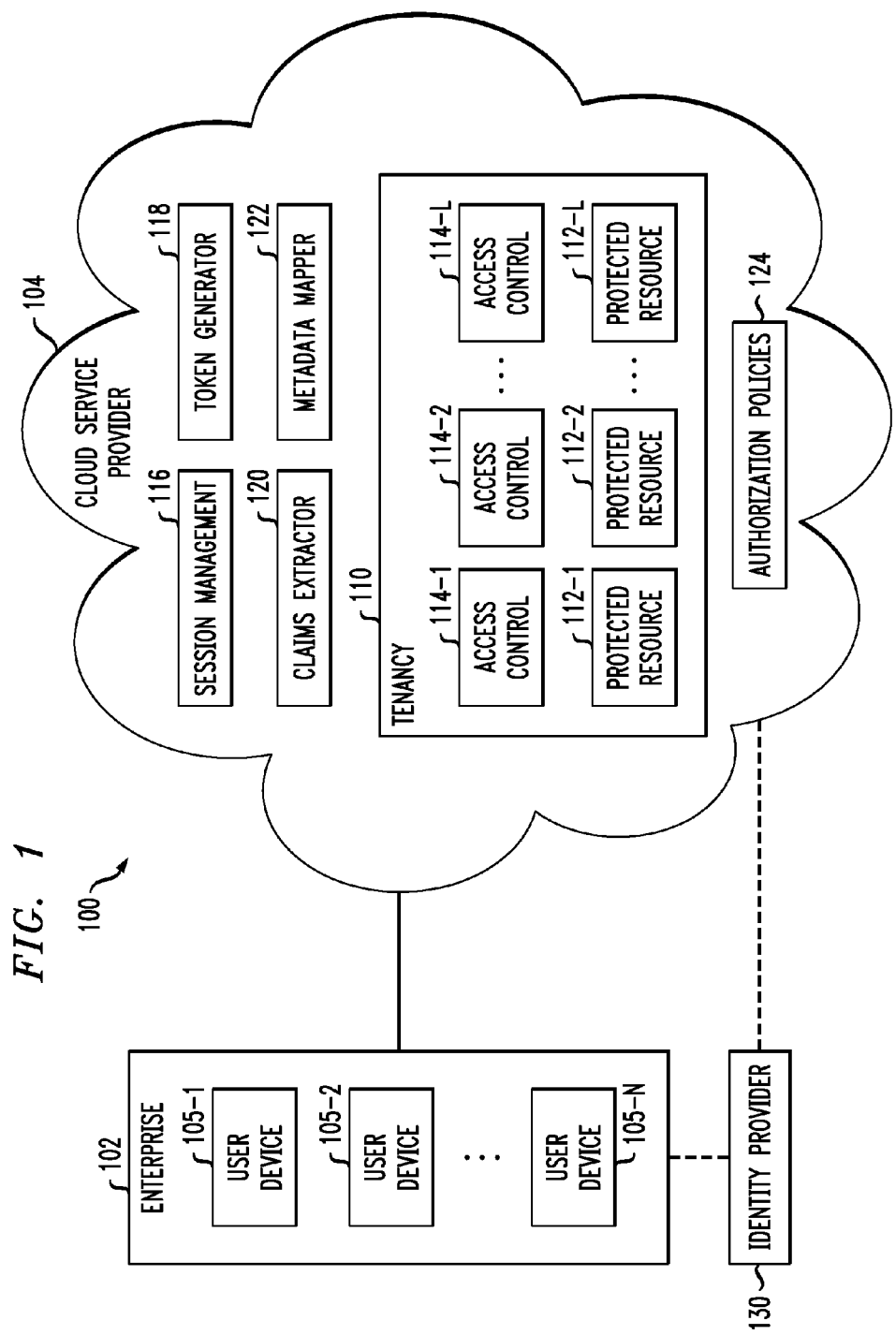
FIG. 1 is a block diagram of information processing system comprising cloud infrastructure configured to implement privacy-preserving user attribute release and session management in one embodiment of the invention.

FIG. 1 shows an information processing system 100 configured in accordance with an illustrative embodiment of the present invention. The information processing system 100 comprises an enterprise 102 and cloud infrastructure 104 assumed to be associated with a cloud service provider.

The enterprise 102 may comprise a company, business, organization or any other entity that interacts with a cloud service provider.

The cloud infrastructure 104 may comprise, for example, software products running on a processing platform of a cloud service provider, although other types of products, including hardware products or virtualized products, may additionally or alternatively be utilized. The cloud infrastructure 104 may be viewed as comprising physical infrastructure and associated virtualization infrastructure running on the physical infrastructure.

The cloud infrastructure 104 or portions thereof may be implemented using one or more processing devices of a processing platform. Examples of processing platforms that may form portions of the cloud infrastructure 104 in system 100 will be described in more detail below in conjunction with FIGS. 3 and 4.

Although the present embodiment is described herein with reference to cloud infrastructure, other embodiments can be implemented using other types of IT infrastructure, as will be readily appreciated by those skilled in the art.

User devices 105-1, 105-2, . . . 105-N associated with enterprise 102 utilize services provided by the cloud service provider in cloud infrastructure 104. The user devices 108 may be configured to allow their corresponding users to access the cloud infrastructure 104 via connections established over a network. Such a network, although not expressly illustrated in FIG. 1, may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

A given one of the user devices 105 in the system 100 may be associated with a single user, or multiple users may be associated with a single device. The term "user" as utilized herein is intended to be broadly construed so as to encompass, for example, a human user associated with a given device or set of devices, an automated user such as an application or other hardware or software component associated with a given device, or any other entity that may control that device.

The cloud service provider maintains a tenancy 110 in cloud infrastructure 104 for the enterprise 102. The tenancy 110 comprises sets of protected resources 112-1, 112-2, . . . 112-L having respective access control modules 114-1, 114-2, . . . 114-L. By way of example, the tenancy 110 may comprise a data center or other type of storage system or computing system maintained in cloud infrastructure 104 for use by the enterprise 102. Such functionality may be provided to the enterprise 102 by the cloud service provider using IaaS, PaaS or SaaS or combinations of such cloud services. The protected resources 112 may comprise, for example, data, applications, services or any other sensitive information, in any combination.

A data center or other storage system or computing system maintained in cloud infrastructure 104 may comprise multiple storage arrays, possibly including storage products such as VNX and Symmetrix VMAX, both commercially available from EMC Corporation of Hopkinton, Mass. A variety of other storage or computing products may be utilized to implement portions of the cloud infrastructure 104.

In order to provide secure access to the protected resources 112 via the access control modules 114, the cloud infrastructure implements a number of additional modules, including a session management module 116, a token generator 118, a claims extractor 120 and a metadata mapper 122. The modules operate in conjunction with one or more authorization policies 124 to control user access to the protected resources 112. As will be described in more detail below, the cloud infrastructure utilizes these modules to provide privacy-preserving user attribute release and session management for users associated with enterprise 102.

The cloud infrastructure 104 in the present embodiment is configured to validate an externally-generated security token issued to a user by an external identity provider 130, to extract one or more claims from the validated externally-generated security token in claims extractor 120, and to create a session object in session management module 116 to hold the extracted claim or claims. The cloud infrastructure 104 issues an internally-generated security token from token generator 118 based on the session object that allows the user to be identified to a given one of the protected resources 112. The internally-generated security token is validated in conjunction with a request from the user for access to the given protected resource, and information associated with at least one extracted claim is selectively released, possibly utilizing the metadata mapper 122, responsive to validation of the internally-generated security token. Access of the user to the protected resource is then granted or denied based on the selectively-released information.

The identity provider 130 is referred to herein as "external" in that it is external to the cloud infrastructure 104 of the cloud service provider. Accordingly, security tokens issued to enterprise users by the identity provider 130 may be viewed as examples of what are more generally referred to herein as "externally-generated security tokens." This is in contrast to what are referred to herein as "internally-generated security tokens," which are assumed to be generated by the cloud service provider or an associated entity internal to the cloud infrastructure 104. Thus, the designations of "external" and "internal" in the context of the present embodiment should be understood to refer to internal and external relative to the cloud service provider that controls access to the tenancy 110 and its associated protected resources 112. In other embodiments, the identity provider 130 may be implemented at least in part within the enterprise 102. Moreover, other designations of internal and external relative to other system entities controlling access to one or more protected resources may be applied in other embodiments of the present invention.

It should also be understood that the various modules 116, 118, 120 and 124 are merely exemplary, and other embodiments may be configured to provide privacy-preserving user attribute release and session management using other types and arrangements of modules. For example, functionality associated with separate modules in the FIG. 1 embodiment may be combined into a single module in other embodiments.

The user devices 105 and portions of the cloud infrastructure 104 may be implemented using a variety of different arrangements of what are generally referred to herein as "processing devices." A given such processing device generally comprises at least one processor and an associated memory, and implements one or more functional modules for controlling certain features of the system 100.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks. The network interface circuitry may comprise one or more conventional transceivers.

The various modules and other elements of cloud infrastructure 104 may be implemented at least in part in the form of software that is stored and executed by respective memory and processor elements of one or more processing devices. Accordingly, as indicated previously, system elements such as tenancy 110, modules 116, 118, 120 and 122, authorization policies 124 and identity provider 130 may therefore be implemented using one or more processing platforms each comprising multiple processing devices. Such processing platforms may comprise cloud infrastructure of a cloud service provider.

The system 100 in the present embodiment implements one or more processes to provide privacy-preserving user attribute release and session management in cloud infrastructure 104 for users associated with enterprise 102. An example of such a process will be described below in conjunction with FIG. 2, but it is to be appreciated that numerous other types of processes may be used in other embodiments.

It is to be appreciated that the particular set of elements shown in FIG. 1 for providing privacy-preserving user attribute release and session management in cloud infrastructure 104 is presented by way of example, and in other embodiments additional or alternative elements may be used.

The operation of the system 100 will now be described in greater detail with reference to the flow diagram of FIG. 2, which illustrates a set of operations performed by the cloud infrastructure 104 in an illustrative embodiment. The process as shown includes steps 200 through 212. The steps may be performed by at least one processing device that includes a processor coupled to a memory and is implemented in one or more processing platforms of the cloud infrastructure 104.

In step 200, an externally-generated security token issued to a user is validated. The externally-generated security token is assumed in the present embodiment to be generated by external identity provider 130, although other entities external to the cloud infrastructure 104 may generate this security token. Other system entities may alternatively issue the security token to the user, or multiple entities can collaborate in generation and issuance of a given security token. The externally-generated security token in the present embodiment is assumed to be received in the cloud infrastructure 104 in conjunction with an access request from the corresponding user, although it may alternatively be received in other ways.

The user referred to in step 200 is assumed to be associated with one of the user devices 105 of the enterprise 102. It is further assumed that the enterprise 102 has previously established a trust relationship with the cloud service provider of the cloud infrastructure 104, via exchange of certificates or by other known techniques. As an example, the enterprise and cloud service provider may establish direct trust by exchange of X.509v3 certificates. Also, metadata indicating a particular external identity provider that the cloud service provider should utilize may be made available by the enterprise to the cloud service provider.

The identity provider 130 generates and issues the security token referred to in conjunction with step 200 upon successful authentication of the user by that identity provider. The term "security token" as used herein is intended to encompass, by way of example, an authentication assertion or other type of authentication information indicative of successful authentication of the user by the identity provider.

A given authentication assertion will generally comprise at least one claim expressed in security assertion mark-up language (SAML). Accordingly, the externally-generated security token received by the cloud infrastructure 104 in the present embodiment may comprise multiple SAML claims or other types of user attributes. The term "claim" as used herein should be understood to encompass a SAML claim or other set of one or more user attributes that is associated with the security token. An advantage of using SAML claims is that such claims avoid the need for online validation of the corresponding assertion.

The involvement of the identity provider 130 can be initiated by the user, its associated enterprise 102 or the cloud infrastructure 104. For example, the externally-generated security token may be received in the cloud infrastructure 104 in conjunction with an initial access request from the user within a corresponding login session. In this exemplary proactive case, the user access request is accompanied by the externally-generated security token and the cloud infrastructure 104 reacts accordingly.

However, if the externally-generated security token is not received in the cloud infrastructure 104 in conjunction with an initial access request from the user within a corresponding login session, the cloud infrastructure 104 may direct the user to the external identity provider 130 so that the user can obtain the appropriate externally-generated security token. In this exemplary reactive case, the user access request initially arrives without the externally-generated security token, and so the user is therefore directed to visit the identity provider to obtain the token. This reactive case may involve redirecting the initial access request received by the cloud infrastructure 104 to the external identity provider 130. Multiple levels of redirection are also possible. For example, a first identity provider to which the request is redirected by the cloud infrastructure can itself redirect the request to another identity provider, and so on.

In step 202, claims are extracted from the validated externally-generated security token. As noted above, such claims may comprise SAML claims or other sets of one or more user attributes. The claims may be extracted using the claims extractor module 120 of the cloud infrastructure 104. Extraction of multiple claims is not a requirement, and thus in other embodiments this step may involve extraction of only a single claim.

In step 204, a session object is created to hold the extracted claims. Such a session object may be created, for example, by the session management module 116 of the cloud infrastructure 104. The term "hold" as used in this context of holding extracted claims is intended to be broadly construed to encompass a wide variety of different techniques for associating extracted claims with a session object.

In step 206, an internally-generated security token is issued based on the session object to identify the user to one of the protected resources 112. This security token may be generated and issued by the token generator 118. The internally-generated security token in the present embodiment is assumed to be generated for a corresponding login session of the user. Accordingly, steps 200 through 206 may be viewed as essentially exchanging the externally-issued security token referred to in step 200 for an internally-generated security token that represents a current login session.

Although only a single internally-generated security token is referred to in step 206, such an internal token issuance may more particularly comprise issuing a plurality of internally-generated security tokens, including a first internally-generated security token to represent that a valid login session has been established for the user, and multiple additional internally-generated security tokens comprising respective service-specific security tokens configured to permit the user to prove its identity to respective services provided in one or more local domains of the cloud infrastructure. Such local domains may correspond, for example, to respective sets of the protected resources 112 and/or their associated access control modules 114, or other respective internal portions of the cloud infrastructure 104.

In step 208, the internally-generated security token refelTed to in step 206 is validated in conjunction with a request from the user for access to the protected resource. The validation process of step 208 may involve, for example, validating the internally-generated security token in an SSO service of a local domain of the cloud infrastructure.

Different types of validation are used for the externally-generated security token and the internally-generated security token in the present embodiment. For example, the externally-generated security token is assumed to be configured for offline validation that does not require access to its corresponding external issuing authority, and the internally-generated security token is configured for online validation that does require access to its corresponding internal issuing authority. The token generator 118 may be viewed as an example of an internal issuing authority as the latter term is used herein.

In step 210, information associated with at least one of the extracted claims is selectively released responsive to validation of the internally-generated security token in step 208. By way of example, the selectively-released information may comprise one or more user attributes from at least one extracted claim, including at least an authenticated identifier of the user, and possibly other authentication information associated with one or more assertions conveyed in conjunction with the externally-generated security token. In determining the particular information to selectively release, the metadata mapper 122 may be used to transform one or more of the extracted claims, for example, to meet the particular requirements of one of the access control modules 114. The selectively-released information in this case comprises information associated with the transformed claim.

It should also be noted that the selective release of information in step 210 may be controlled in accordance with one or more specified policies, such as one or more of the authorization policies 124.

Metadata mapping in step 210 can be performed in a variety of different ways, including based on class or type of user, or on a per-resource or per-tenancy basis. In general, the approach of transforming the claims via metadata mapping ensures that any application or other protected resource in the tenancy 110 can support the use of authorization policies 124 expressed in any standardized form, such as in XACML 3.0 language, without any prior agreement on the attribute namespace that is to be used to express the corresponding access control rules. Accordingly, no prior coordination or agreement is needed between entities such as cloud service provider, tenant administrator, application developer and policy administration point defining the authorization policy.

Selective release of information associated with at least one extracted claim may involve releasing different sets of one or more user attributes in conjunction with different access requests directed to different ones of the protected resources 112, such that a given one of the protected resources is unaware of all the user attributes contained in the extracted claims. This serves to preserve privacy in certain ones of the user attributes relative to certain ones of the protected resources.

As one example, the cloud infrastructure 104 may redact certain attributes upon entry into the tenancy 110, then release a first subset of the remaining attributes to an application A, and then subsequently release a disjoint or overlapping subset of the remaining attributes to another application B. In conjunction with each such release, the particular released subsets of attributes are transformed into respective namespaces understood by the respective applications. This allows the application developers to implement respective authorization policies that are decoupled from and independent of any particular attribute management processes employed by the enterprise 102. Similar advantages are provided for cloud services or other types of protected resources 112 implemented in tenancy 110.

The step of selectively releasing information may be controlled at least in part by the internal issuing authority noted above. The cloud infrastructure 104 may be configured, for example, such that services within the tenancy 110 need to contact the internal issuing authority to validate the service-specific tokens. At this time, the internal issuing authority can selectively release a subset of the user attribute information. Again, the service or other protected resource that is the subject of the access request from the user remains unaware of at least a portion of the information associated with the extracted claims.

In the present embodiment, the cloud service provider can utilize an attribute release policy to selectively release information about the user to applications or other protected resources that are hosted in the tenancy 110. The scope of a given attribute release policy may be limited to a specific application or other protected resource, set of applications or other protected resources, or the entire tenancy. The attribute release policy may also be managed comprehensively across the cloud infrastructure 104.

In step 212, access of the user to the protected resource is granted or denied based on the information selectively released in step 210. In the present embodiment, access of the user to the protected resource can be granted or denied without requiring any further contact between the cloud infrastructure 104 and the external identity provider 130, other than that associated with any redirection of the initial access request to the external identity provider. The present embodiment therefore eliminates the need to maintain any live connection back from the cloud infrastructure 104 to the external identity provider 130.

As noted above, step 206 may involve issuance of multiple internally-generated security tokens, including a first internally-generated security token to represent that a valid login session has been established for the user, and multiple additional internally-generated security tokens comprising respective service-specific security tokens configured to permit the user to prove its identity to different services provided in the cloud infrastructure 104. Accordingly, steps 208 through 212 may be repeated for different access requests received from the user within the login session, using different ones of the service-specific security tokens.

By way of example, the user can establish a single login session with the tenancy 110 that requires access to multiple applications in that tenancy, and for each access to a different application, present a different service-specific security token to obtain access, using steps 208 through 212 of the process. Once the user ends the login session by logging out, the next access of that user will start a new login session, once again involving execution of the full set of steps 200 through 212. After the user logs out, the tenancy does not retain any user attribute information, with the possible exception of any information required to be retained by law within the corresponding jurisdiction.

In some embodiments, session state information may be provided to the user, periodically or otherwise, so as to facilitate processing of additional access requests from the user within a given login session. Such session state information may be provided by the session management module 116.

Upon termination of the login session, the cloud infrastructure 104 deletes the extracted claims, including the selectively-released information, so as to preserve privacy in associated user attributes. Thus, in the present embodiment, the user attributes associated with the extracted claims are stored in memory only for the duration of the login session, and are not written to disk or other persistent storage. Because this illustrative embodiment avoids the need to persistently store user attribute information within the cloud infrastructure, risk of loss of user attribute information is significantly reduced, even in the event of a breach in cloud infrastructure security. Audit compliance is also facilitated. Moreover, seamless federated access to a diverse array of protected resources is provided in a manner that exhibits significantly reduced overhead and complexity relative to conventional arrangements.

Figure 2:
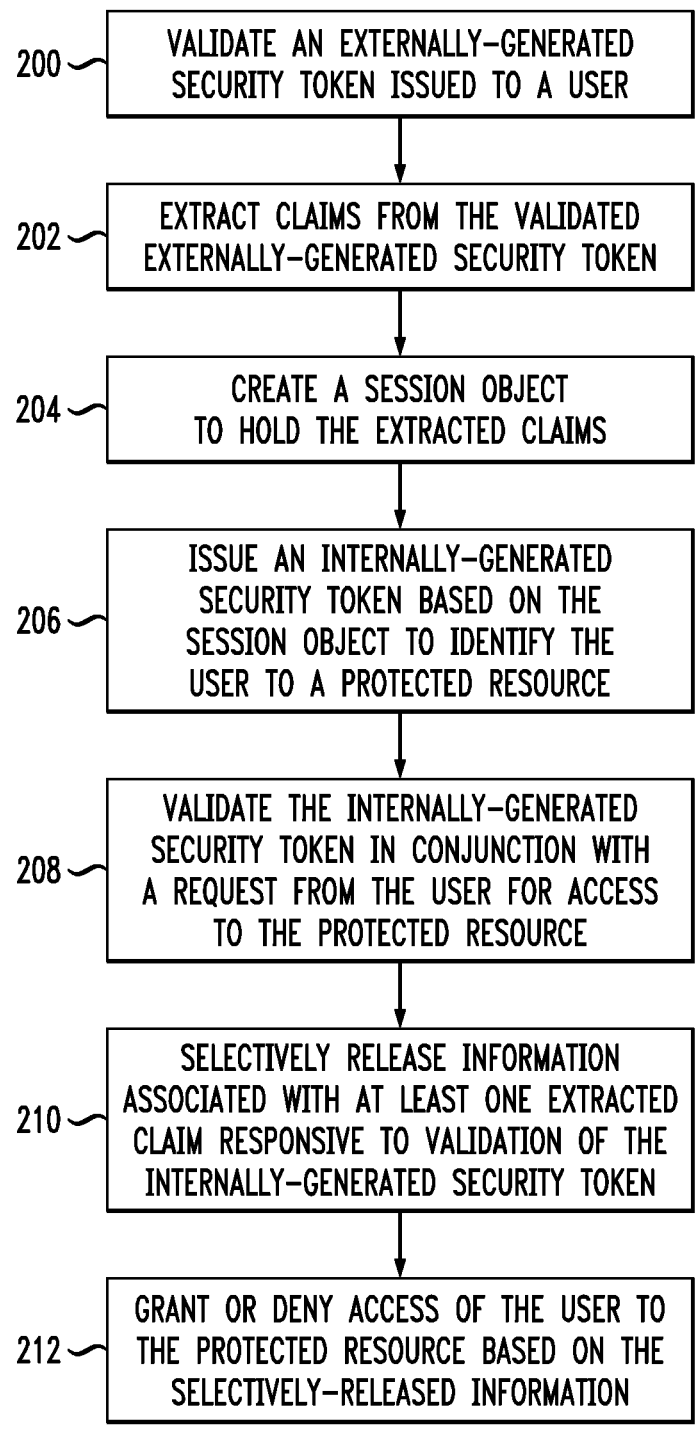
FIG. 2 is a flow diagram of an exemplary process for privacy-preserving user attribute release and session management in the system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing privacy-preserving user attribute release and session management.

For example, the ordering of the process steps may be varied in other embodiments, or certain steps may be performed concurrently with one another rather than serially. Also, one or more of the process steps may be repeated periodically or on an as-needed basis responsive to particular events. As mentioned above, the steps of the FIG. 2 process are assumed to be implemented in a processing platform comprising at least one processing device having a processor coupled to a memory.

It is to be appreciated that privacy-preserving user attribute release and session management functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, a given such embodiment can be configured to provide improved access control for protected resources 112 in tenancy 110 of cloud infrastructure 104 through privacy-preserving user attribute release and associated session management. A given embodiment can comprehensively manage the transformation of user attribute information for controlling access to different protected resources in a manner that provides optimal preservation of user privacy in these attributes. Risk of loss of user attribute information is therefore significantly reduced even in the event of a breach in cloud infrastructure security. Moreover, these advantages are achieved while also avoiding the drawbacks associated with maintaining a live connection back to an external identity provider, persistently store storing user attribute information within the cloud infrastructure, and provisioning and maintenance of ACL databases.

Figure 3:
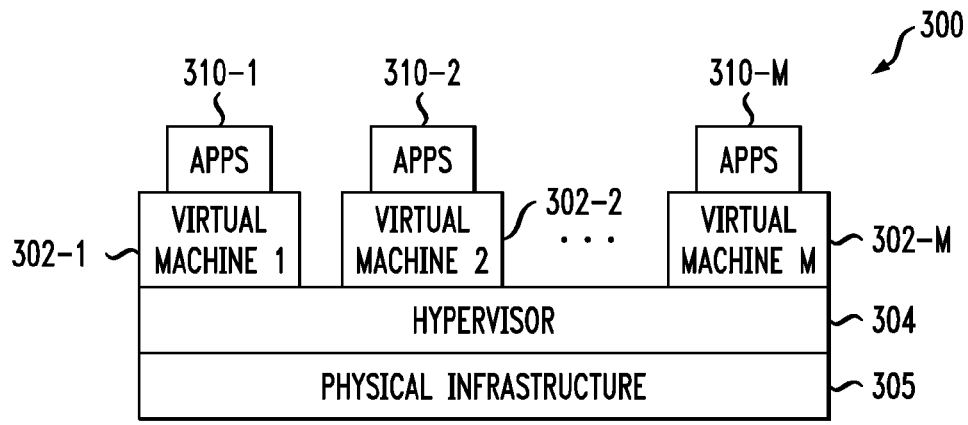
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 300 of information processing system 100 in one or more embodiments of the invention is the VMware® vSphere™ which may have an associated virtual infrastructure management system such as the VMware® vCenter™.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
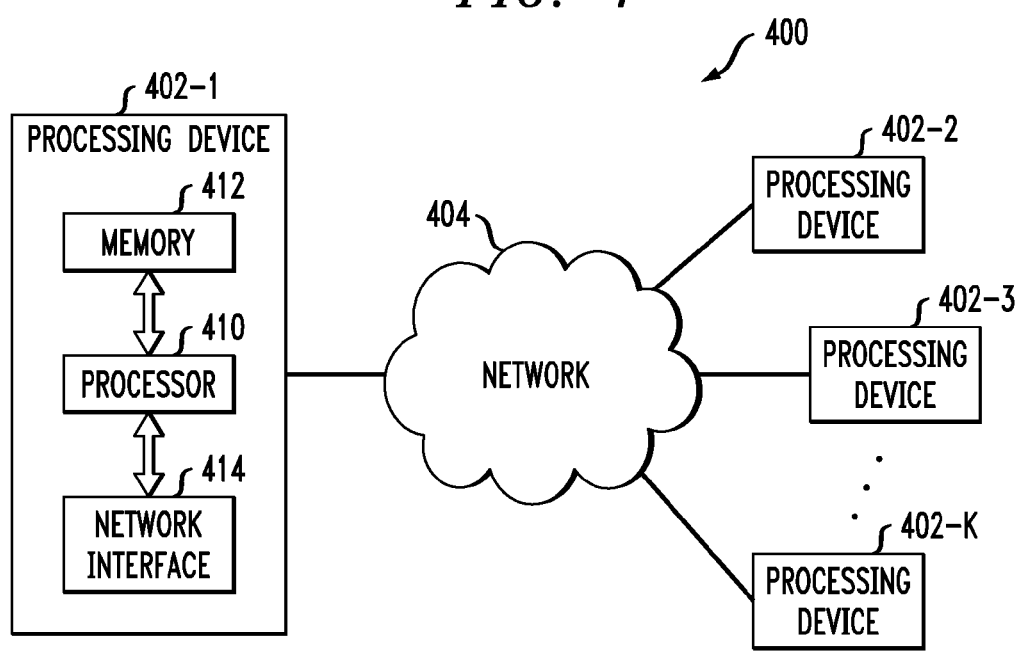

Multiple elements of information processing system 100 may be collectively implemented on a common processing platform of the type shown in FIG. 3 or 4, or each such element may be implemented on a separate processing platform.

Figure 5:
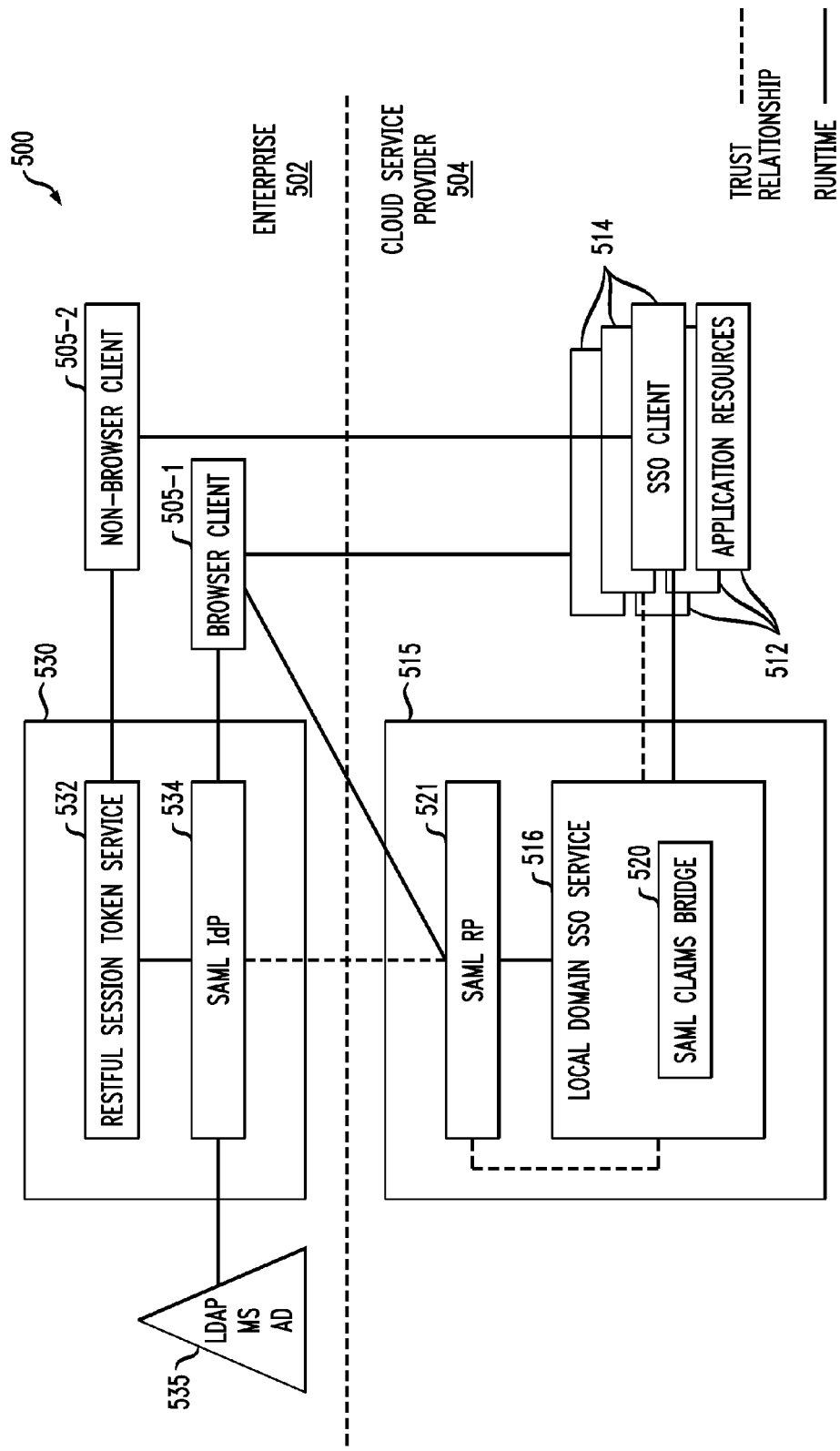
FIG. 5 shows an information processing system comprising cloud infrastructure configured to implement privacy-preserving user attribute release and session management in another embodiment of the invention.

Referring now to FIG. 5, an additional illustrative embodiment of the present invention will be described.

In the FIG. 5 embodiment, an information processing system 500 comprises an enterprise 502 that interacts with a cloud service provider 504. The enterprise 502 comprises a plurality of clients including a browser client 505-1 and a non-browser client 505-2.

On the cloud service provider side of the system 500, a plurality of SSO clients 514 are associated with respective application resources 512. The SSO clients 514 interact with a module 515 that includes a local domain SSO service 516, a SAML claims bridge 520 and a SAML request processor (RP) component 521.

Additional components on the enterprise side of the system 500 include an identity provider module 530 that comprises a RESTful session token service 532 and a SAML identity provider (IdP) 534. Coupled to the identity provider module 530 is a Microsoft Active Directory (MS AD) component 535 that is implemented based on Lightweight Directory Access Protocol (LDAP).

Assume that a user associated with one of the clients 505 of enterprise 502 attempts to access one of the application resources 512 in the cloud service provider portion of the system 500. If the user does not present the appropriate externally-generated security token, the corresponding access request is redirected to the local domain SSO service 516, which in turn redirects the access request to the identity provider module 530 in order to allow the user to obtain the externally-generated security token. The user logs in to the SAML IdP 534, which interacts with the LDAP MS AD component 535, and is provided an assertion upon successful authentication. The assertion may be provided either directly from SAML IdP in the case of browser client 505-1 or indirectly via RESTful session token service 532 in the case of non-browser client 505-2.

It is also assumed in this embodiment that the security token comprises an authentication assertion containing claims. The claims associated with this assertion are further assumed to comprise one or more sets of user attributes.

The user request is then redirected back to the cloud service provider 504. The cloud service provider accepts and validates the authentication assertion associated with the externally-generated security token and extracts the claims. Metadata mappings are referenced and claims may be transformed and cached using the SAML bridge 520. The authenticated user identifier is passed on to the local domain SSO service 516 which creates one or more internally-generated security tokens for the user.

The user request including the internally-generated security token from the local domain SSO service 516 is redirected to the appropriate SSO client 514 associated with the requested application resource 512. The SSO client 514 has a trust relationship with the local domain SSO service 516, indicated by a dashed line in the figure, through which it can validate the internally-generated security token.

Once the token is validated, the SAML bridge 520 is used to transform the claims extracted from the externally-generated security token so as to selectively release user attribute information to the SSO client 514. The SSO client 514 uses this selectively-released information to determine if the user request for access to the application resource 512 should be granted or denied.

As in previously-described embodiments, the local domain SSO service 516 in the FIG. 5 embodiment can issue multiple internally-generated security tokens in order to allow the user to access multiple distinct application resources 512 within a given login session.

It should again be emphasized that the above-described embodiments of the invention are presented for purposes of illustration only. Many variations and other alternative embodiments may be used. For example, the disclosed techniques are applicable to a wide variety of other types of information processing systems, processing platforms and processing device configurations, enterprises, information technology infrastructure, tenancies, protected resources and associated access control modules. Accordingly, the particular configuration of system and device elements shown in FIGS. 1 and 3-5, and the process shown in FIG. 2, can be varied in other embodiments. Moreover, any assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:

validating an externally-generated security token issued to a user;

extracting one or more claims from the validated externally-generated security token;

creating a session object to hold the extracted one or more claims;

issuing a plurality of internally-generated security tokens based on the session object to identify the user to respective protected resources in one or more local domains of an entity;

validating a given one of the internally-generated security tokens in conjunction with a request from the user for access to a given protected resource in a given one of the local domains using an access control module associated with the given local domain;

selectively releasing, by an internal issuing authority to the access control module associated with the given local domain, information associated with at least one extracted claim responsive to validation of the internally-generated security token; and granting or denying access of the user to the given protected resource based on the selectively-released information;

wherein the externally-generated and internally-generated security tokens are respectively generated externally and internally relative to the entity;

wherein selectively releasing information associated with at least one extracted claim comprises releasing different sets of one or more user attributes in conjunction with different access requests directed to different ones of the protected resources; and wherein said steps are performed by at least one processing device comprising a processor coupled to a memory.

2. The method of claim 1 wherein said at least one processing device is implemented in cloud infrastructure comprising said entity.

3. The method of claim 1 wherein the plurality of internally-generated security tokens include a first internally-generated security token to represent that a valid login session has been established for the user and additional internally-generated security tokens comprising respective service-specific security tokens configured to permit the user to prove its identity to respective services provided in one or more local domains of the entity.

4. The method of claim 1 wherein the externally-generated security token is received in the entity in conjunction with an access request from the user.

5. The method of claim 1 wherein the externally-generated security token is generated by an identity provider external to the entity upon successful authentication of the user by the identity provider.

6. The method of claim 5 further including the steps of:
responsive to receiving a request for access to the given protected resource from a user that has not established a login session with the entity, directing the user to a local domain single sign-on service to obtain an internally-generated security token for the given protected resource, wherein directing the user to the local domain single sign-on service comprises redirecting the access request from the access control module associated with the given local domain to the local domain single sign-on service; and
responsive to determining that the externally-generated security token has not been received in the entity, directing the user to the external identity provider to obtain the externally-generated security token, wherein directing the user to the external identity provider comprises redirecting the access request from the local domain single sign-on service to the external identity provider.

7. The method of claim 5 further including the step of directing the user to the external identity provider if the externally-generated security token is not received in the entity in conjunction with an initial access request from the user within a corresponding login session.

8. The method of claim 7 wherein directing the user to the external identity provider comprises redirecting the initial access request to the external identity provider.

9. The method of claim 8 wherein granting or denying access of the user to the given protected resource comprises granting or denying said access without requiring any further contact between the entity and the external identity provider other than that associated with redirection of the initial access request to the external identity provider.

10. The method of claim 3 wherein the first internally-generated security token is generated for a corresponding login session of the user.

11. The method of claim 1 wherein the externally-generated security token is configured for offline validation that does not require access to its corresponding external issuing authority and at least one of the internally-generated security tokens is configured for online validation that does require access to its corresponding internal issuing authority.

12. The method of claim 11 wherein the internal issuing authority controls the step of selectively releasing information such that the given protected resource is unaware of at least a portion of said one or more extracted claims.

13. The method of claim 1 wherein the user is associated with an enterprise that has established a trust relationship with the entity via exchange of certificates.

14. The method of claim 10 wherein upon termination of the login session the extracted claims including the selectively-released information are deleted so as to preserve privacy in associated user attributes.

15. The method of claim 14 wherein the user attributes are stored in memory of the entity only for the duration of the login session and are not written to persistent storage of the entity.

16. The method of claim 1 wherein said one or more claims extracted from the externally-generated security token comprise at least one claim expressed in a security assertion mark-up language.

17. The method of claim 1 wherein the one or more user attributes include at least an authenticated identifier of the user.

18. The method of claim 1 wherein selectively releasing information associated with at least one extracted claim further comprises:
transforming the claim using one or more metadata mappings; and
releasing information associated with the transformed claim.

19. The method of claim 1 wherein selectively releasing information associated with at least one extracted claim further comprises releasing information in accordance with one or more specified policies.

20. The method of claim 1 wherein the given protected resource is unaware of all the user attributes contained in said at least one extracted claim, so as to preserve privacy in certain ones of the user attributes relative to certain ones of the protected resources.

21. The method of claim 1 further comprising providing session state information to the user so as to facilitate processing of additional access requests from the user within a given login session.

22. A computer program product comprising a non-transitory processor-readable storage medium having encoded therein executable code of one or more software programs, wherein the one or more software programs when executed by at least one processing platform cause the processing platform to perform the steps of the method of claim 1.

23. The method of claim 1 wherein the internal issuing authority comprises a local domain single sign-on service.

24. An apparatus comprising:
information technology infrastructure comprising one or more processing devices, each of such processing devices comprising a processor coupled to a memory;
said one or more processing devices being configured to perform the steps of:
validating an externally-generated security token issued to a user;
extracting one or more claims from the validated externally-generated security token;
creating a session object to hold the extracted one or more claims;
issuing a plurality of internally-generated security tokens based on the session object to identify the user to protected resources in respective ones of one or more local domains of an entity;
validating a given one of the internally-generated security tokens in conjunction with a request from the user for access to a given protected resource in a given one of the local domains using an access control module associated with the given local domain;
selectively releasing, by an internal issuing authority to the access control module associated with the given local domain, information associated with at least one extracted claim responsive to validation of the internally-generated security token; and granting or denying access of the user to the given protected resource based on the selectively-released information;

wherein the externally-generated and internally-generated security tokens are respectively generated externally and internally relative to the entity that controls access to the protected resources; and wherein selectively releasing information associated with at least one extracted claim comprises releasing different sets of one or more user attributes in conjunction with different access requests directed to different one of the protected resources.

25. The apparatus of claim 24 wherein the entity comprises cloud infrastructure of the information technology infrastructure.

26. An information processing system comprising at least one processing platform which incorporates the apparatus of claim 24.

27. An apparatus comprising:
a claims extractor configured to extract one or more claims from a validated security token of a first type;
a token generator configured to issue a plurality of security tokens of a second type responsive to the validation of the security token of the first type, the plurality of security tokens of the second type identifying a user to protected resources in respective ones of one or more local domains; and
access control modules associated with respective ones of the protected resources;

wherein a given one of the security tokens of the second type is validated in conjunction with a request from the user for access to a given protected resource by its associated access control module, and information associated with at least one extracted claim is selectively released by an internal issuing authority to the access control module associated with the given protected resource responsive to validation of the security token of the second type; and wherein the access control module associated with the given protected resource grants or denies access of the user to the given protected resource based on the selectively-released information; and wherein the issuing authority is configured to selectively release information comprising different sets of one or more user attributes in conjunction with different access requests to different ones of the protected resources.

28. The apparatus of claim 27 wherein the claims extractor, token generator and access control module are implemented by cloud infrastructure, and further wherein the security tokens of the first and second types comprise respective externally-generated and internally-generated security tokens relative to the cloud infrastructure.

* * * * *

UNITED STATES PATENT AND TRADEMARK OFFICE
CERTIFICATE OF CORRECTION

| | | |
|---|---|---|
| PATENT NO. | : 8,850,546 B1 | Page 1 of 1 |
| APPLICATION NO. | : 13/632014 | |
| DATED | : September 30, 2014 | |
| INVENTOR(S) | : John P. Field et al. | |

It is certified that error appears in the above-identified patent and that said Letters Patent is hereby corrected as shown below:

In the Specification

Column 7, line 23, change "refelTed" to --referred--

Column 10, line 9, before "storing" delete "store"

Signed and Sealed this
Twenty-third Day of December, 2014

Michelle K. Lee
*Deputy Director of the United States Patent and Trademark Office*